Patented Aug. 10, 1943

2,326,132

UNITED STATES PATENT OFFICE 2,326,132

METHOD OF MAKING COTTAGE CHEESE

Ernest D. Fear, Kansas City, Mo., assignor of thirty per cent to Irving E. Fear and twenty per cent to Helendoris Murphy, both of Kansas City, Mo.

No Drawing. Application February 15, 1939, Serial No. 256,507

5 Claims. (Cl. 99—116)

My invention relates to a method of making cottage cheese.

Cottage cheese, sometimes known as schmierkase, clabber cheese, Dutch cheese or pot cheese, is a soft curd cheese. Overman reports (Illinois Station Circular No. 235 (1919)), the following analysis for cottage cheese:

|   | Percent |
|---|---|
| Protein | 20.9 |
| Butter fat | 1.0 |
| Carbohydrates | 4.3 |
| Moisture | 73.8 |

Various methods of manufacturing cottage cheese have been employed. It is usually made from whole or skim milk. It is one of the few cheeses which may be made from reconstituted milk obtained from evaporated milk, condensed milk, or milk powder. It appears that most milk plants use their surplus milk in the confection of cottage cheese. At times when the supply of milk is decreased, or there is an increased demand for cottage cheese, it may be made from reconstituted milk.

Skim milks vary greatly in their lactic acid content, with the result that cottage cheese made at various times will vary in texture. If milk is pasteurized to higher temperatures than that used in bottled whole milk, the action of coagulation agents, such as rennet, is very much retarded.

When evaporated milk, condensed milk or milk powder is used, either in whole or in part, the rennet action becomes very variable, depending upon the amount of evaporated milk, condensed milk or milk powder which is employed. If the milk powder was made by the roller process, it has been subjected to temperatures from 200 to 220° F. If the milk powder was made by the spray process, it will have been subjected to a temperature from 175 to 200° F. If the skim milk is highly acid, the curd formed is tough and its keeping qualities are impaired.

One object of my invention is to provide a novel method for making cottage cheese.

Another object of my invention is to provide a method of making cottage cheese in which the cheese produced will be always uniform in quality and taste.

A further object of my invention is to provide a cottage cheese in which the curd is soft and palatable and of improved keeping qualities.

Other and further objects of my invention will appear from the following description.

In making cottage cheese according to my method, any suitable milk product may be used, such as skim milk, evaporated milk, condensed milk or milk powder. When evaporated milk, condensed milk or milk powder is used, either alone or in mixture with skim milk, the milk concentrate is reconstituted by the addition of water and the mixture is brought back to the same specific gravity as skim milk, which should be between 1.036 and 1.038. If it be attempted to make cottage cheese from this mixture, as has been the practice in the prior art, the results will be very variable, due to the rennet retardation effect of the lactic acid and due to the variation in the lactic acid content between different batches of skim milk or reconstituted skim milk being processed.

Accordingly, I standardize the hydrogen ion concentration of the skim milk to a point having a pH between 6.6 and 7.4 by means of an alkaline agent selected from the class consisting of calcium oxide and magnesium oxide. I cannot use ordinary neutralizers, such as sodium or potassium carbonates. The reaction product of the neutralization with an alkaline carbonate is carbon dioxide gas. This is highly soluble in the water portion of the milk and creates carbonic acid, which is a solvent for the metal of the vats and other containers in which the cottage cheese is being manufactured, resulting in what is known as "metallic" flavors in the cottage cheese.

Any suitable method for determining pH may be employed. A convenient method for use in my process is to employ an indicator such as brilliant yellow, neutral red, phenol sulphonphthalein, or meta-nitrophenol. Brilliant yellow presents a yellow color at a pH lower than 6.6, and turns definitely orange at a pH of about 7.9. Neutral red is red in color at a pH of 6.8 and becomes amber at a pH of 8. Phenol sulphonphthalein is yellow at a pH below 6.8 and turns red at a pH of 8.4. Metanitrophenol is clear at a pH of 6.8 and turns yellow at a pH of 8.6. Another indicator which may be used is rosalic acid. This indicator is amber at a pH below 6.2 and turns definitely purple at a pH of 7.

After the pH of the skim milk mixture has been standardized by the addition of sufficient calcium oxide or magnesium oxide, the milk may be coagulated. At this point I may add an anhydrous dextrose in order to produce what is known as a "sweet-curd" cottage cheese. The dextrose gives the curd a sweeter flavor. Substantially all of the milk sugar is carried from the curd in the whey, and the addition of sugar tends to raise the carbohydrates of the finished product. Any of the commercial enzymes, such as rennet or pepsin, may be used as the coagulating agent in the confection of cottage cheese. The amount of enzyme used, of course, will depend upon its strength. Ordinarily one cubic centimeter of rennet and one-half gram of pepsin per hundred gallons of milk, weighing approximately nine hundred pounds, will produce the desired coagulation. Due to the standardization of the hydrogen ion concentration, I am always sure of having a uniform coagulation since I have eliminated the retarding effect of unknown lactic acid and variations produced by the varying lactic acid content.

The curd produced by the coagulation of skim milk having a pH between 6.6 and 7.4 produces a softer curd showing a pronounced improvement in keeping qualities.

In those plants in which it is desired to commence the process of manufacturing the cheese in the morning and complete it before evening, the five hour process is recommended. It is understood, of course, that the milk is standardized to a pH between 6.6 and 7.4 in all cases before the coagulating agent is added. The addition of sugar in the form of dextrose may be varied according to taste. It is recommended that from 5 percent to 5.75 percent of sugar by weight, based upon the quantity of milk, be added. The milk is then heated to a temperature of 90° F., and 1.5 cubic centimeters of rennet, diluted in about a pint of cold water, is added for each hundred gallons of milk used, it being understood that the milk is held at a temperature of 90° F.

In the sixteen hour process, the milk may be left in the cheese vat over night and the curd will be ready to cut and cook in the morning. In this process after the milk has been standardized to a hydrogen ion concentration between 6.6 and 7.4, it is heated to a temperature between 142 and 145° F., held at this temperature for thirty minutes and then cooled to 72° F., after which 1 cubic centimeter of a coagulating agent, such as rennet, diluted with one pint of cold water, is added for each hundred gallons of milk. The temperature is maintained at 72° F. When the curd is ready to cut, it is divided into the usual curd cubes with horizontal and vertical curd knives, and the usual cooking process for cottage cheese is carried out, using cooking temperatures of 90° F. The whey is not removed until the curd particles split clean when pressed, and the inside of the curd particles appear to be devoid of free whey.

It will be understood, of course, that there is an amount of whey absorbed and disseminated through the curd. This whey gives the cheese its flavor, since the soluble constituents such as the mineral content of the milk and the sugar, are present in the whey.

It should be herein noted that my process presents a marked improvement over the methods of the prior art, since the curd need not be washed. Heretofore, due to the presence of off flavor constituents, some cheeses were not palatable until the curd had been washed. The washing replaces the absorbed whey with the wash water.

After the process has been completed sufficient cream may be added to the curd to bring the butter fat content of the cheese to at least five percent butter fat, or more, depending upon the practice of the individual manufacturer. The cream added should be standardized to have a hydrogen ion concentration between 6.6 and 7.4. This standardization may be accomplished by the addition of sufficient calcium or magnesium oxides. A cream containing from 18 to 20 percent butterfat is recommended to give proper texture and richness to the finished product. If desired, additional dextrose or other sugar may be added at this time if a sweet cheese is desired.

If it is desired to give a distinctive flavor to the cottage cheese, a lactic organism culture of any suitable type may be added in the process. In the five hour process if a culture is to be used, about ten percent by weight of the milk of a culture may be added immediately after the milk has been standardized to the hydrogen ion concentration between 6.6 and 7.4. In the sixteen hour process, about one gallon of a culture for each hundred gallons of the milk may be added immediately after the milk has been standardized to the desired hydrogen ion concentration range, and after it has been cooled to 72° F. The lactic organisms are employed for flavor production, but rennet or other suitable enzyme, is used for coagulation.

While my method has been described with particular reference to cottage cheese, it is to be understood that cottage cheese has been given for purposes of illustration only, and not by way of limitation, since my method is applicable to any of the soft cheeses. This is particularly true where the particular culture employed imparts the characteristic flavor to the cheese. In such case an excess of lactic acid produced from organisms which give a non-palatable or "sour" taste, is particularly detrimental in the cheese manufacture.

Due to the fact that in my process no washing of the curd is necessary, an increased yield of cottage cheese is produced, as there is no loss of solids in suspension, such as lactose, albumen, casein and the ash constituents of the milk, most of which are removed during the washing process. Not only is the flavor of the cheese enhanced and uniform, but a softer curd with better texture and body is produced.

It will be seen that I have accomplished the objects of my invention. I have provided a method of making cottage cheese, and soft cheeses in general, which insures the production of a uniform quality cheese of enhanced flavor. The cheese has a sweet curd of good texture and improved keeping qualities.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A process of making cheese including the steps of adding an alkaline agent selected from the class consisting of calcium and magnesium hydroxides to milk from which the cheese is to be made in sufficient quantity to bring the hydrogen ion concentration of the milk to a pH value between 6.6 and 7.4, and then coagulating the casein of the milk by the aid of an enzymic coagulating agent.

2. A method as in claim 1 in which a lactic organism culture is added to the milk before the coagulating step.

3. A method as in claim 1 in which the milk to which the alkaline agent is added comprises a reconstituted milk obtained by adding water to a milk concentrate.

4. A method as in claim 1 in which the curd formed by the coagulating agent is cooked at a temperature in the vicinity of 90° F. in the presence of whey.

5. A method as in claim 1 in which the curd formed by the coagulating agent is cooked at a temperature in the vicinity of 90° F. in the presence of the whey until the curd particles split clean when pressed, and then the curd particles are admixed with sufficient cream to give the finished cheese a butter fat content of at least five percent by weight.

ERNEST D. FEAR.